United States Patent [19]

Silver et al.

[11] Patent Number: 5,146,491
[45] Date of Patent: Sep. 8, 1992

[54] TELEPHONE BILLING METHOD

[75] Inventors: David Silver, Newtonville; Stanley Kugell, Newton Center, both of Mass.

[73] Assignee: Pilgrim Telephone, Inc., Newtonville, Mass.

[21] Appl. No.: 742,135

[22] Filed: Aug. 8, 1991

[51] Int. Cl.⁵ .......................................... H04M 15/12
[52] U.S. Cl. ................................. 379/114; 379/120; 379/130
[58] Field of Search ............. 379/127, 114, 121, 116, 379/120, 130

[56] References Cited

U.S. PATENT DOCUMENTS 4,054,756 10/1977 Comella et al. .................. 379/114
5,003,584 3/1991 Benyacar et al. ............. 379/121 X

*Primary Examiner*—Stafford D. Schreyer
*Attorney, Agent, or Firm*—Sprung Horn Kramer & Woods

[57] ABSTRACT

A method of telephone billing comprise providing a toll-free number to a customer to access a provider in a toll-free call from an originating customer telephone number, receiving the originating customer telephone number in response to the toll-free call, converting the toll-free call to a billable call during or after the toll-free call and billing the billable call to the originating customer telephone number.

18 Claims, 4 Drawing Sheets

TELEPHONE BILLING METHOD

BACKGROUND OF THE INVENTION

The present invention relates to a method of telephone billing.

Presently, there are many different types of telephone services available. For example, there is an 800 number telephone service which is a toll-free call for the caller and a billable call for the receiving party. Moreover there are 900 and 976 number calls, long distance, operated assisted and collect calls which are billable directly to the telephone number of the caller.

SUMMARY OF THE INVENTION

The main object of the present invention is to provide a billable service which allows a customer to dial a toll-free 800 telephone number or make a local call to place a call to a service or product provider and then at the customer's option, during the call, agree to change the call to a billable call.

The customer may typically dial an 800 number, interact with a human operator or computer system to learn something about the products or services offered, and then agree to accept billing for the call. The agreement may be made orally or by pressing one or more touch tone keys on the customer's telephone.

Examples of products and services could include, dial-a-pizza, dial legal services, dial other professional services, dial customer support from computer companies, party lines, dating services, charitable contributions, political contributions, ordinary long distance service, etc.

The unique characteristics of this service are that the billing for the call changes from toll-free to billable during the call, the customer gives informed consent to be billed for the call and/or value added service compared with the standard long distance 900 or 976 call where the customer takes an action but may not be fully informed of the charges.

This system is different from similar services that are available. For example 800 number catalog sales involve a customer calling a store's 800 number and ordering an item billed to a credit card. The call and the purchase are separate transactions, i.e., the order could just as easily been placed by mail.

Another prior art example is the long distance telephone companies which offer their customers an 800 number to dial for placing long distance calls. The customer dials the 800 number, and enters a number to call and an account number to bill. The difference is that there is no connection between the call to the 800 number and the subsequent purchase of a long distance call. Any access method could be used to make the purchase. The 800 call is not billed, instead the customer enters an account number to bill. In the present invention, once the call is converted from a non-billable to billable call there is billing for the initially free call itself.

Moreover, the telephone number of the caller and thus the address and billing information is automatically received by standard caller identification equipment available to subscribers so that the customer need not enter any of this information other than making the initial call and selecting one of several products or services from a menu given during the toll-free call. However the system can also work with the call identified by entering the number from the caller's keypad, oral communication of the number to an operator or by voice recognition.

These and other features and advantages of the present invention are achieved in accordance with the present invention by a method of telephone billing comprising the steps of providing a toll-free number to a customer to access a provider in a toll-free call from an originating customer telephone number, receiving the originating customer telephone number in response to the toll-free call, converting the toll-free call to a billable call during or after the toll-free call and billing the billable call to the originating customer telephone number.

The step of converting from a toll-free call to a billable call comprises presenting a menu of items and billing rates to a customer, selecting one of the items and the corresponding billing rate and converting the call to a billable call at the corresponding billing rate. Thus for example if the services are legal services at a given billable rate per minute, this rate will be charged to the customer for the amount of time the customer is connected and will be charged directly on the customer's telephone bill. If on the other hand the customer selects a product such as a pizza, the rate for the pizza will be immediately charged directly to the customer's telephone bill.

The method also includes the step of converting the billable call back to a toll-free call after the billing has been completed. Thus the steps of selecting one of the items in the corresponding billing from the menu can be repeated as many times as desired by the customer without hanging up the telephone.

In accordance with the invention, the menu of items can be presented by a human operator or by a recording by means of a computer. The individual items can be selected by oral statements or by pressing at least one touch tone key on the customer's telephone.

In another embodiment of the invention, the toll-free or local call is converted to a billable call by capturing the caller telephone number, presenting a menu of products and services to the customer, asking the customer to select a service and calling the customer back collect at the captured number for the selected service.

These and other features of the invention will become more apparent from the following detailed description taken with the attached drawing, wherein:

DETAILED DESCRIPTION OF THE INVENTION

Figure 1:
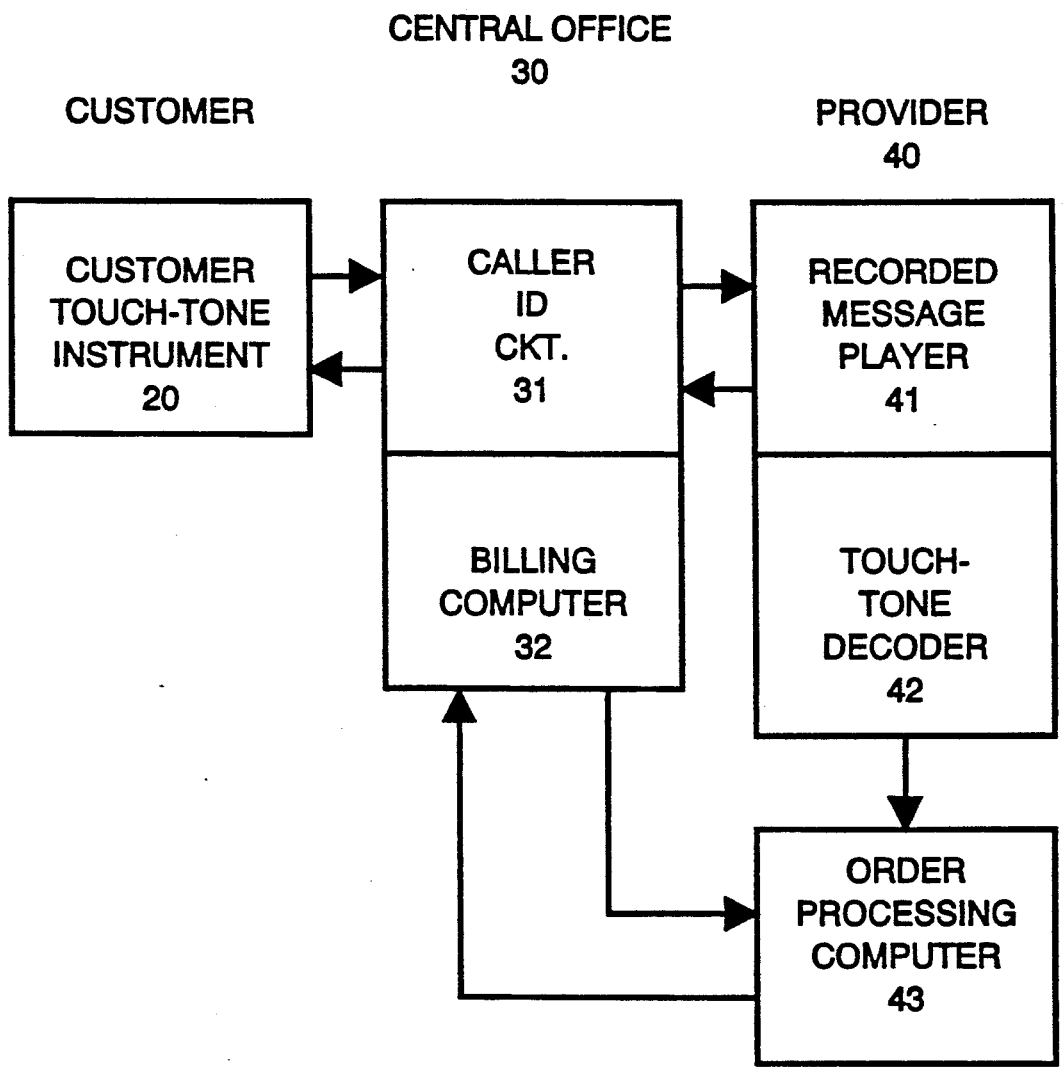
FIG. 1 is a block diagram of a system for carrying out the method according to the present invention.

Referring to FIG. 1, a system for telephone billing includes a customer touch tone telephone instrument 20 which is connected by conventional cabling to a telephone company central office 30 having conventional caller identification circuitry 31 and billing computer 32 which bills the customer for billable calls such as 900, 976 and collect calls, and the receiving party for toll-free calls such as 800 calls.

The central office 30 is connected to a provider system 40 having a recorded message playback system 40 which lists for a customer the types of products and services available and the billing rates therefor. The provider system has a touch tone decoder 42 which receives a touch tone response from the customer instrument to indicate the product or service selected.

The decoder 42 controls ordering computer 43 which receives the billing formation from identification circuitry 31 and communicates with the billing computer 32 to indicate that the call is converted to a billable call and what the billing rate is. The computer 43 also initiates the ordering of the product or service selected by the customer and has the billing information to send the product to the correct address.

Figure 2:
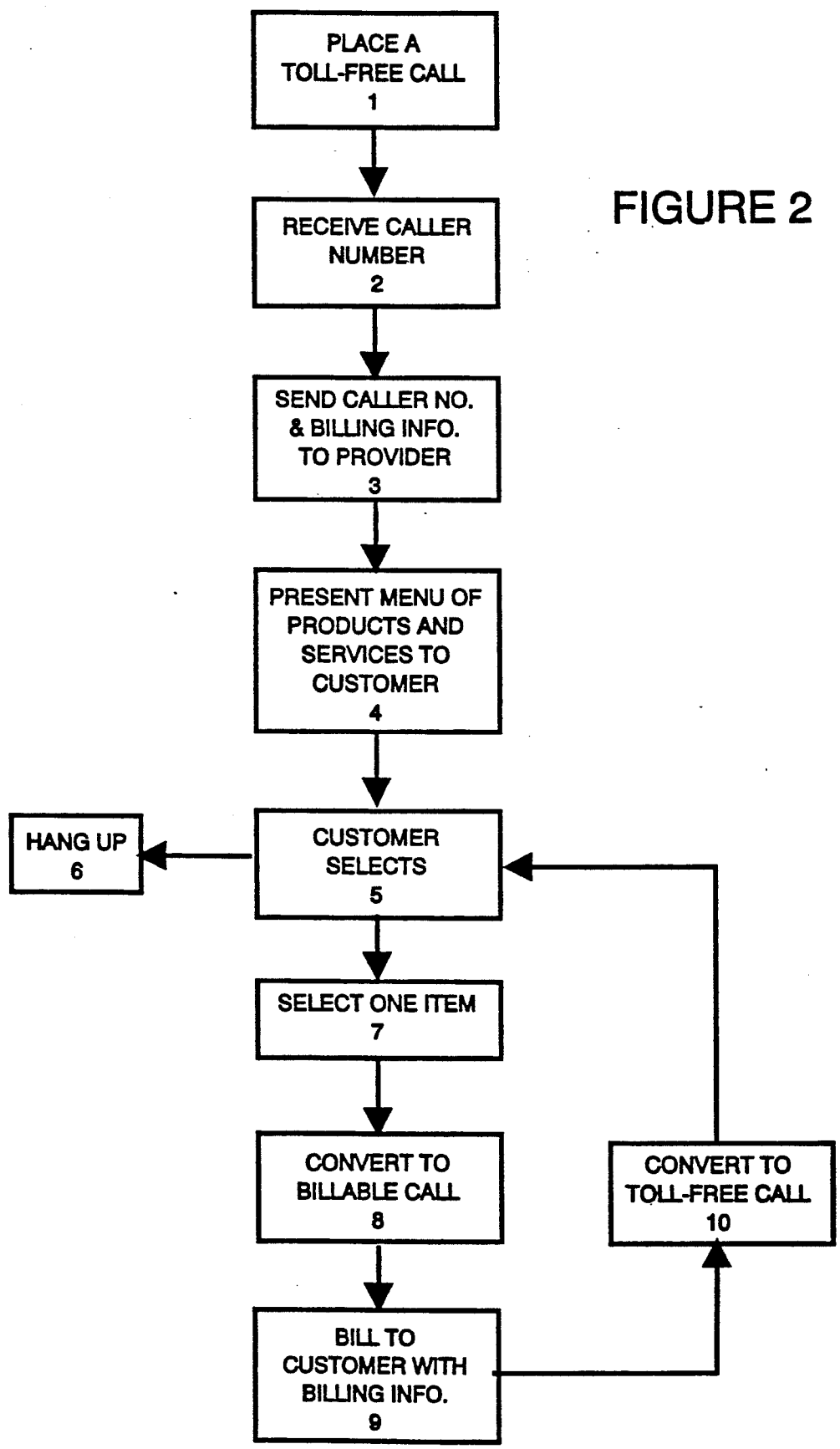
FIG. 2 is a flow chart of the method according to the present invention.

As shown in the FIG. 2, the method according to the present invention includes the step 1 of placing a toll-free call either by an 800 number or a local call which effects the receipt of the customer's telephone number in step 2. The caller telephone number and billing information is sent from the central office to the provider in step 3, whereupon a number of items including services and/or products are presented to the customer in step 4, still in a toll-free call. The customer has the option of hanging up in step 6 and thus terminating the call without any charge to the customer, or the customer has the ability to select one item in step 7. As soon as the selection is made via striking a touch tone key or orally to an operator the call is converted to a billable call in step 8 and the selected service or product is billed to the customer telephone number in step 9.

Thereafter, in step 10 the call is converted back to a toll-free call and the customer in step 5 is presented with the menu again so that the customer can select one of the other products or services or can hang up in step 6.

Figure 3:
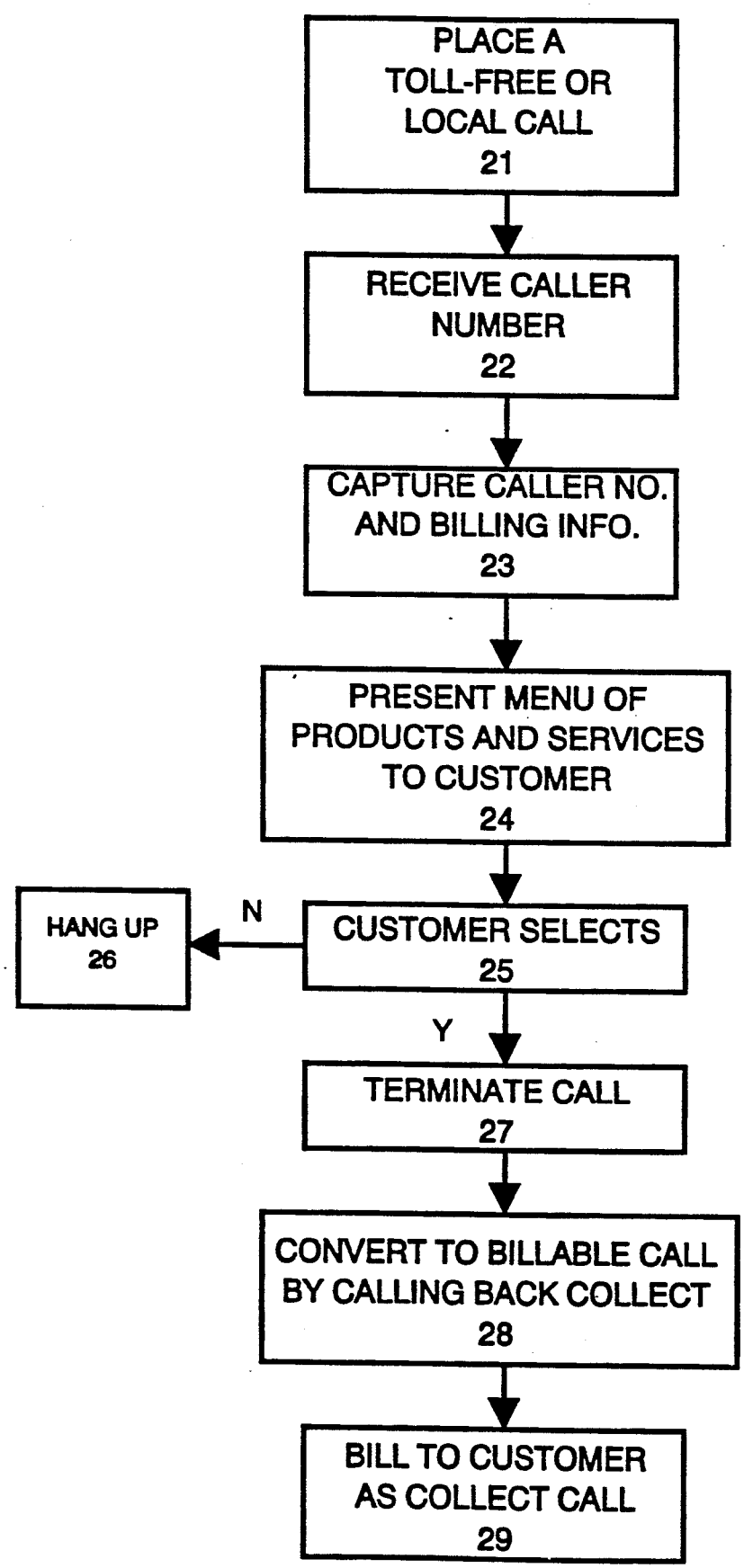
FIG. 3 is a flow chart of another embodiment of the method according to the present invention.

In an alternative embodiment shown in FIG. 3, the customer places a toll-free or local call in step 21 which effects the receipt of the customer's telephone number in step 22. The caller telephone number and billing information is sent from the central office to the provider in step 23, whereupon a number of items including services and/or products are presented to the customer in step 24. At this point, the call is still a local call or a toll free call.

In step 25, the user has the option of selecting one of the products or services or hanging up the phone in step 26. The customer selects a product or service by striking a touch tone key or orally informing an operator. At this point, the call is terminated at step 27. In step 28, the call is converted to a billable call by the provider using the captured caller telephone number to call back the customer in a collect call. When the customer consents to receive the collect call, a customer telephone number is billed for the product or service in step 29.

One of the characteristics of the caller ID circuit 31 is that the caller's telephone number is captured after the call is placed by the caller, but before the call is answered. This fact makes it possible for this system to filter out callers prior to converting the toll free call to a billable call.

Thus in another embodiment of the present invention, the provider 40 has, in the order processing computer 43, a database of telephone numbers including data relating thereto. For example, the database would include the information as to whether a telephone number is from a pay phone. If the telephone number is from a pay phone, then the call would not be answered after the number was captured and the call would be terminated by, for example, answering with a busy signal or with a recorded message informing the customer that the desired service or goods cannot be obtained from a pay phone. Additionally, data can be maintained for a telephone number which indicates whether the caller has previously failed to pay money which was due on a telephone bill or a bill from a provider or if the customer requested that such calls be blocked. If such is the case, then the call would not be accepted and a busy signal will be returned or a recorded message would be played indicating the reason why the call could not be accepted.

Another parameter that can be stored in the database for each number is a spending limit for that number. Thus if customer is only permitted to spend $100.00 per month for telephone billing, if that amount has been met or exceeded during a given month, the system will not allow the call to be received and a busy signal will be returned or a prerecorded message would be played explaining the situation. Other data that could be stored in the database would be prior ordered preferences of the customer and regional information. This information could be used to provide further call processing for the customer.

Figure 4:
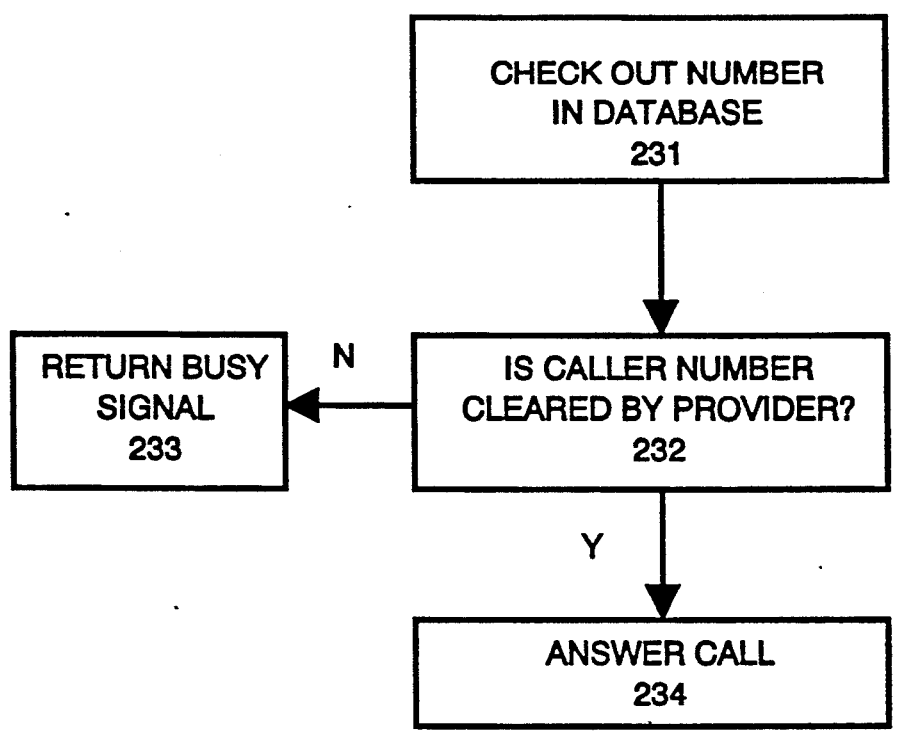
FIG. 4 is a flow chart of another feature of the method according to the present invention.

This database feature is shown in FIG. 4 as steps 231-234 which occur between steps 3 and 4 in FIG. 2 and between steps 23 and 24 in FIG. 3.

In step 231, after the caller number has been received and before a call has been answered, the telephone number is checked out in the database of the provider.

As explained heretofore, the database is checked to see if the caller is calling from a pay phone, if the caller has a bad debt or if the caller has exceeded a monthly charge limit. If the caller is not cleared by the provider in step 232, a busy signal is returned in step 233. If the caller is cleared by the provider, the call is answered in step 234 and the method proceeds as shown in FIGS. 2 and 3.

It will be appreciated that the instant specification and claims are set forth by way of illustration and not limitation, and that various modifications and changes may be made without departing from the spirit and scope of the present invention.

What is claimed is:

1. A method of telephone billing comprising the steps of:
   a. providing a toll-free number or local number to a customer to access a provider in a toll-free call or local call from an originating customer telephone number;
   b. receiving the originating customer telephone number in response to the toll-free call;
   c. converting the toll-free call to a billable call during or after the toll-free call; and
   d. billing the billable call to the originating customer telephone number.

2. The method according to claim 1, wherein the step of converting comprises presenting a menu of items and billing rates to the customer, selecting one of the items and the corresponding billing rate and converting the call to a billable call at the corresponding billing rate.

3. The method according to claim 2, wherein the menu of items is presented by a human operator.

4. The method according to claim 2, wherein the menu of items is presented by a recording.

5. The method according to claim 2, wherein the step of selecting comprises pressing at least one touch-tone key on a customer telephone.

6. The method according to claim 2, wherein the items include products.

7. The method according to claim 2, wherein the items include services.

8. The method according to claim 1, further comprising the step of:
   e. converting the billable call back to a toll-free call after the step of billing.

9. The method according to claim 8, further comprises repeating steps c–e.

10. The method according to claim 9, wherein the steps c–e are repeated by pressing at least one touch-tone key on a customer telephone.

11. The method according to claim 1, wherein the step of converting comprises presenting a menu of items and billing rates to the customer, selecting one of the items and the corresponding billing rate and converting the call to a billable call at the corresponding billing rate by terminating the toll-free or local call and calling back the customer at the originating customer telephone number in a collect call at the corresponding billing rate.

12. The method according to claim 11, wherein the menu of items is presented by a human operator.

13. The method according to claim 11, wherein the menu of items is presented by a recording.

14. The method according to claim 11, wherein the step of selecting comprises pressing at least one touch-tone key on a customer telephone.

15. The method according to claim 1, further comprising prior to the step of converting, the steps of maintaining a database of caller telephone numbers, looking up the originating customer telephone number in the database and rejecting or answering the call in response to information stored in the database for the originating customer telephone number.

16. The method according to claim 15, wherein the step of rejecting the call comprises returning a busy signal.

17. The method according to claim 15, wherein the database includes information relating to whether the originating customer telephone number is a pay telephone.

18. The method according to claim 15, wherein the database includes information relating to debt associated with the originating customer telephone number.

* * * * *